United States Patent [19]

Staub et al.

[11] Patent Number: 5,644,179
[45] Date of Patent: Jul. 1, 1997

[54] GAS COOLED END TURNS FOR DYNAMOELECTRIC MACHINE ROTOR

[75] Inventors: Fred Wolf Staub, Niskayuna; Emil Donald Jarczynski, Scotia, both of N.Y.

[73] Assignee: General Electric Company, Schenectady, N.Y.

[21] Appl. No.: 358,276

[22] Filed: Dec. 19, 1994

[51] Int. Cl.⁶ .................................................. H02K 9/00
[52] U.S. Cl. .................................... 310/65; 310/270
[58] Field of Search ........................ 310/270, 52, 58, 310/59, 60 R, 60 A, 64, 65

[56] References Cited

U.S. PATENT DOCUMENTS

| | | | |
|---|---|---|---|
| 1,819,860 | 8/1931 | Belfils | 310/65 X |
| 2,425,997 | 8/1947 | Criner et al. | 171/252 |
| 2,786,951 | 3/1957 | Morgan | 310/61 |
| 2,833,944 | 5/1958 | Willyoung | 310/61 |
| 2,844,746 | 7/1958 | Coggeshall | 310/65 |
| 3,225,231 | 12/1965 | Kudlacik | 310/64 |
| 3,465,183 | 9/1969 | Wallenstein | 310/54 |
| 3,846,651 | 11/1974 | Mishra | 310/65 X |
| 4,335,324 | 6/1982 | Fujioka et al. | 310/61 |
| 4,365,177 | 12/1982 | Madsen | 310/65 X |
| 4,415,822 | 11/1983 | Aiba | 310/59 |
| 4,486,676 | 12/1984 | Moore et al. | 310/52 |
| 4,546,279 | 10/1985 | Hammer et al. | 310/59 |
| 4,656,382 | 4/1987 | Moore et al. | 310/270 |
| 4,709,177 | 11/1987 | Kaminski | 310/59 |
| 5,252,880 | 10/1993 | Kazmieczak et al. | 310/270 |

*Primary Examiner*—Mark O. Budd
*Attorney, Agent, or Firm*—Patrick K. Patnode; Donald S. Ingraham

[57] ABSTRACT

Cooling of the rotor endwindings in a dynamoelectric machine is improved by providing radially-extending ducts in the spacers located between the concentric end turns of the rotor winding. The ducts have an inlet located near the radially inward end of the spacer and an outlet located near the radially outward end of the spacer. The inlet can be formed on either an axially-oriented surface of the spacer or a circumferentially-oriented surface of the spacer. The ducts direct cooling air into the cavities between the end turns in such a manner that the circulation velocity in the cavities is increased. This results in increased heat removal capability.

10 Claims, 3 Drawing Sheets

GAS COOLED END TURNS FOR DYNAMOELECTRIC MACHINE ROTOR

BACKGROUND OF THE INVENTION

This invention relates generally to dynamoelectric machines such as large turbo-generators and more particularly to cooling the end turns of the rotor winding in such machines.

A rotor for a dynamoelectric machine typically comprises a cylindrical forging of magnetic metal having a plurality of axially-extending slots formed therein at circumferentially spaced positions. Conductor bars are disposed in the slots for carrying current. The ends of the conductor bars are suitably connected with conductive end turns to form the required current pattern. Because the conductor bars and end turns give rise to resistive heating, means for cooling the rotor winding are required. Effective cooling of the rotor winding contributes directly to the output capability of a dynamoelectric machine.

Rotor endwindings are difficult regions to cool effectively, as evidenced by the various schemes that have been devised for this purpose. Conventional techniques include providing cooling passages directly in the end turn conductors ("direct cooling") or creating regions of relatively higher and lower pressures to force cooling gas to pass over conductor surfaces ("forced cooling"). These conventional techniques add considerable complexity and cost to rotor construction. For example, directly cooled conductors must be machined or fabricated to form the cooling passages. In addition, an exit manifold must be provided to discharge the gas into the rotor. Forced cooling schemes require the rotor end region to be divided into separate pressure zones, with the addition of numerous baffles, flow channels and pumping elements.

An alternative to these expensive active cooling schemes is passive cooling, sometimes referred to as "free convection cooling." Passive cooling relies on the centrifugal and rotational forces of the rotor to circulate gas in the blind, dead-end cavities formed between the concentric end turns. While passive cooling provides the advantages of minimum complexity and cost, heat removal capability is comparatively weak compared to active cooling because of low circulation velocities inside the cavities. One known approach to increasing gas velocity in the cavities is to machine holes in the retaining ring which encloses the end turns. However, because the retaining ring is under very high stress, openings therein can lead to mechanical failure.

Accordingly, there is a need for a passive cooling system for cooling rotor endwindings with improved heat removal capability without diminishing the structural integrity of the retaining rings.

SUMMARY OF THE INVENTION

The above-mentioned needs are met by the present invention in which the heat removal capability of a passive cooling system is improved by driving more cooling gas into the cavities formed between the concentric end turns. A higher gas flow rate increases the circulation velocity and the local heat transfer coefficient. This is accomplished by providing a dynamoelectric machine rotor having axially extending coils and end turns extending axially beyond at least one end of said body portion with one or more spacers located between concentric end turns. In accordance with the present invention, each spacer has a radially-extending duct formed therein for directing cooling gas into the cavities between end turns. The duct has an inlet located near the radially inward end of the spacer and an outlet located near the radially outward end of the spacer. The inlet can be formed on either an axially-oriented surface of the spacer or a circumferentially-oriented surface of the spacer.

By providing a flow of cooling gas into the upper portion of the cavities, the ducts in the spacers significantly improve the inherent gas flow patterns generated by the rotating endwindings. This results in increased heat removal capability while maintaining low cost, simplicity and reliable construction. In addition, the improved passive cooling system will increase the current carrying capability of the rotor, producing an increased output rating for the generator.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
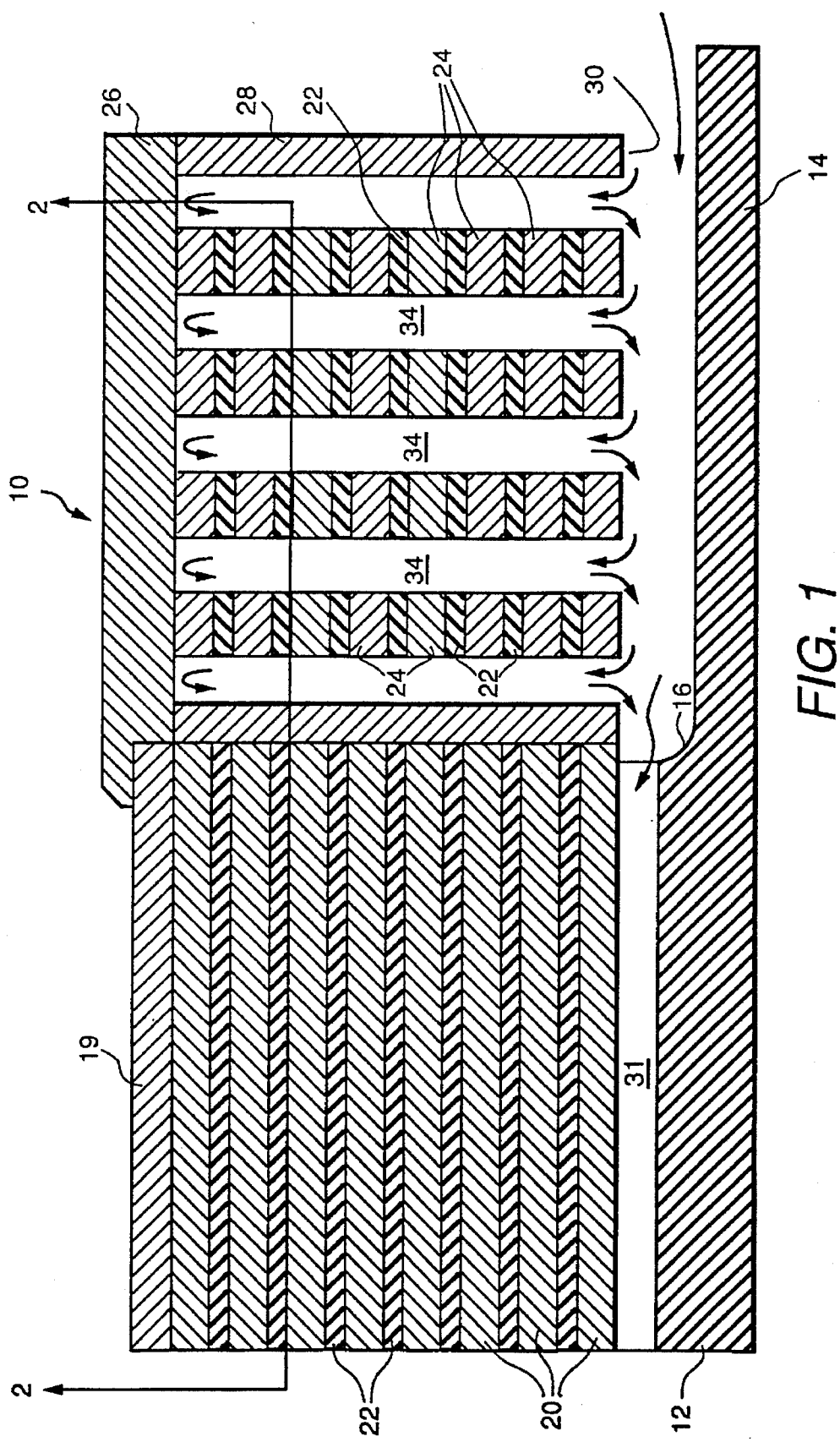
FIG. 1 is a cross-sectional view of a portion of the end turn region of a dynamoelectric machine rotor in accordance with the present invention.
Figure 2:
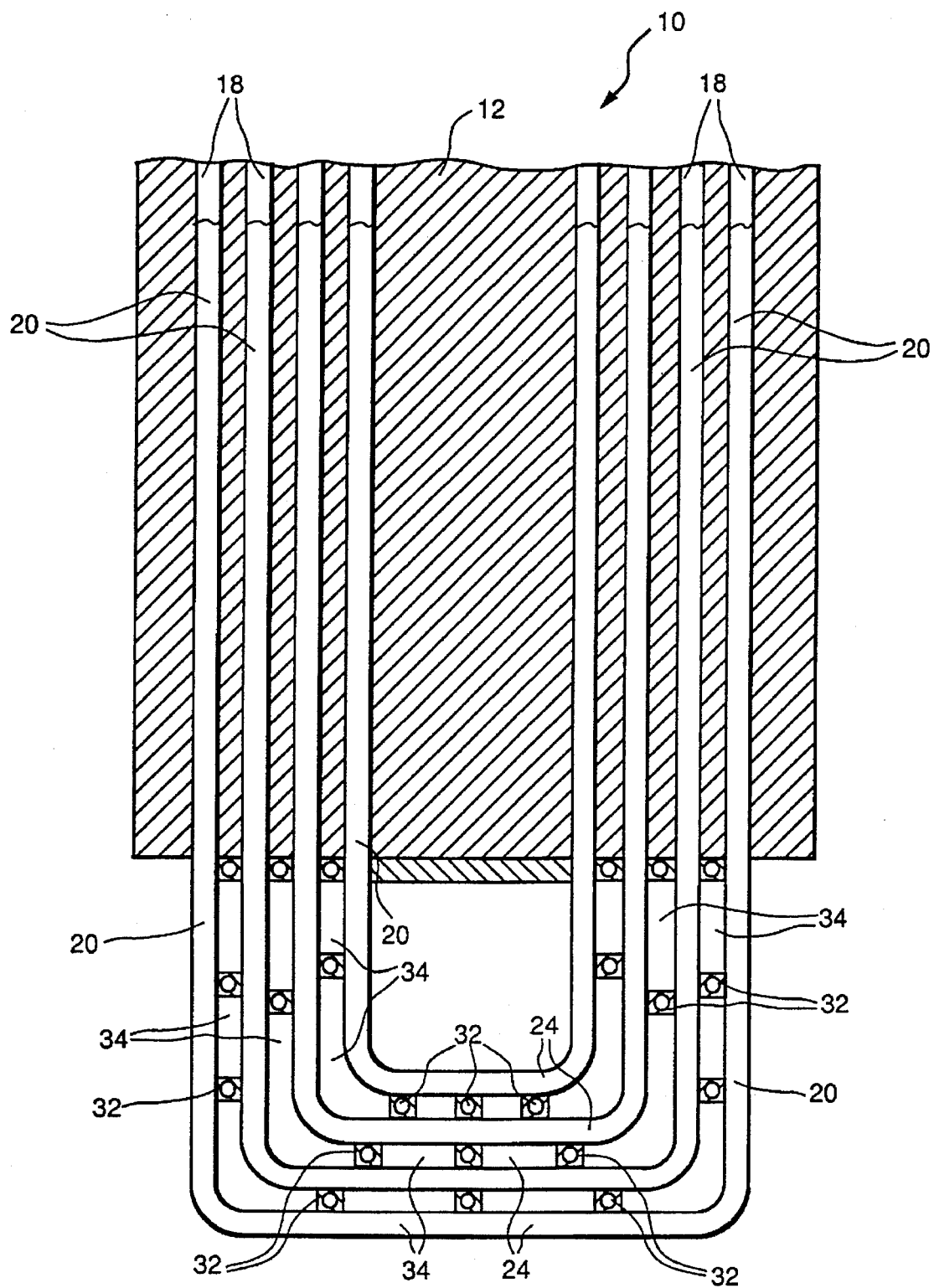
FIG. 2 is a cross-sectional top view of the dynamoelectric machine rotor taken along line 2—2 of FIG. 1.

Referring to the drawings wherein identical reference numerals denote the same elements throughout the various views, FIGS. 1 and 2 show a rotor 10 for a gas-cooled dynamoelectric machine which also includes a stator (not shown) surrounding the rotor. The general operation of dynamoelectric machines such as large turbo-generators is well known and needs not be described here. The rotor 10 includes a generally cylindrical body portion 12 centrally disposed on a rotor spindle 14 and having axially opposing end faces 16, of which a portion of one end face 16 is shown in FIG. 1. The body portion 12 is provided with a plurality of circumferentially-spaced, axially extending slots 18 for receiving concentrically arranged coils which make up the rotor winding. For clarity, only four rotor coils are shown, although several more are commonly used in practice.

Specifically, a number of conductor bars 20 constituting a portion of the rotor winding are stacked in each one of the slots 18. Adjacent conductor bars 20 are separated by layers of electrical insulation 22. The stacked conductor bars 20 are typically maintained in the slots 18 by wedges 19 (FIG. 1) and are made of a conductive material such as copper. The conductor bars 20 are interconnected at each opposing end of the body portion 12 by end turns 24 which extend axially beyond the end faces 16 to form stacked endwindings. The end turns 24 are also separated by layers of electrical insulation 22.

Referring specifically to FIG. 1, a retaining ring 26 is disposed around the end turns 24 at each end of the body portion 12 to hold the endwindings in place against centrifugal force. The retaining ring 26 is fixed at one end to the body portion 12 and extends out over the rotor spindle 14. A centering ring 28 is attached to the distal end of the retaining ring 26. It should be noted that the retaining ring 26 and the centering ring 28 can be mounted in other ways, as is known in the art. The inner diameter of the centering ring 28 is radially spaced from the rotor spindle 14 so as to form a gas inlet passage 30. A number of axial cooling channels 31 formed along slots 18 are provided in fluid communication with the gas inlet passage 30 to deliver cooling gas to the coils.

Turning to FIG. 2, the end turns 24 at each end of the rotor 10 are circumferentially and axially separated by a number of spacers 32. (For clarity of illustration, the spacers 32 are not shown in FIG. 1.) The spacers 32 are elongated blocks of an insulating material located in the spaces between adjacent end turns 24 and extending beyond the full radial depth of the endwindings. Accordingly, the spaces between the concentric stacks of the end turns 24 are divided into cavities 34. These cavities 34 are bounded on the top by the retaining ring 26 and on four sides by adjacent stacks of the end turns 24 and adjacent spacers 32. As best seen in FIG. 1, each of these cavities 34 is in fluid communication with the gas inlet passage 30. A portion of the cooling gas entering the annular region between the endwinding and the rotor spindle 14 through the gas inlet passage 30 enters the cavities 34, circulates therein, and then returns to the annular region between the endwinding and the rotor spindle 14. Air flow direction is shown by the arrows in FIG. 1.

Figure 3:
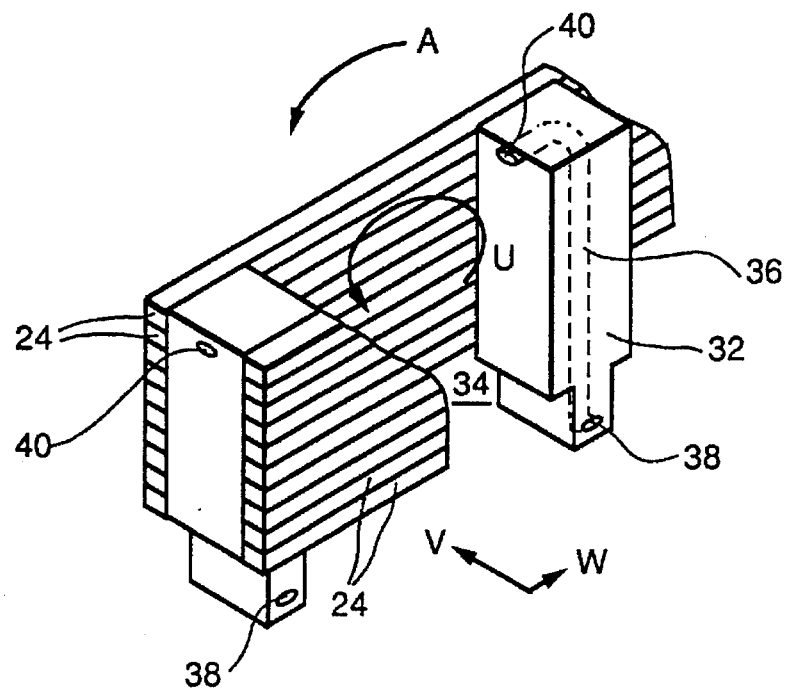
FIG. 3 is a perspective view, partially broken away, of a portion of the rotor end turn region showing a first embodiment of the present invention.

Referring now to FIG. 3, there is illustrated a partial section of the rotor endwinding showing one of the cavities 34 with the direction of rotation indicated by arrow A. The cooling gas velocities relative to the inner radius of the rotor endwinding have component velocities V and W in the axial and circumferential directions, respectively, as shown in FIG. 3. The relative velocities drive the circulation velocity U inside the cavity 34. In accordance with the present invention, each spacer 32 is provided with an internal cooling gas duct 36 for increasing the circulation velocity U inside the cavities 34 and thereby increasing heat removal. Each cooling gas duct 36 lies along the length of its spacer 32 and is thus oriented radially with respect to the rotor 10. The ducts 36 extend from a point radially inward of, or below, the endwinding to a point near the retaining ring 26 and thus provide passages through which cooling gas can flow from the annular region between the endwinding and the rotor spindle 14 to the cavities 34.

Specifically, each duct 36 extends from an inlet opening 38 located near the radially inward end of the spacer 32 to an outlet opening 40 located near the radially outward end of the spacer 32, near the retaining ring 26. The inlet opening 38 is disposed on an axially-oriented surface of the spacer 32 facing the axial velocity component V. As seen in FIG. 3, the inlet opening 38 is located on the portion of the spacer 32 that extends below the endwinding so as to be in fluid communication with the annular region between the endwinding and the rotor spindle 14. The portion of the spacer 32 extending below the endwinding may be made narrower in the circumferential direction then the rest of the spacer 32. By reducing the size of this portion of the spacer 32, flow blockage from any axially aligned spacers is minimal. Outlet opening 40 is disposed on a circumferentially-oriented surface of the spacer 32 and is in fluid communication with one of the cavities 34 bounded by the spacer 32.

In operation, rotor rotation will cause cooling gas to be drawn through the gas inlet passage 30 into the annular region between the endwinding and the rotor spindle 14. This cooling gas flow can be augmented by a fan attached to the rotor 10. Such fans are commonly provided to force cooling gas throughout the dynamoelectric machine. As mentioned above, the cooling gas flow will have axial and circumferential velocity components V and W, respectively. Thus, a kinetic pressure head is present which drives cooling gas through the inlet openings 38 into the ducts 36. The cooling gas in ducts 36 is expelled into the corresponding cavities 34 from the outlet openings 40. The outlet openings 40 are located in the top of the cavities 34 in such a manner that the flow of cooling gas emitted therefrom accelerates the circulation velocity U inside each cavity 34. That is, the outlet openings 40 are arranged so that cooling gas is emitted in the same direction the gas is circulating. Increased circulation velocity causes heat removal to be increased.

Figure 4:
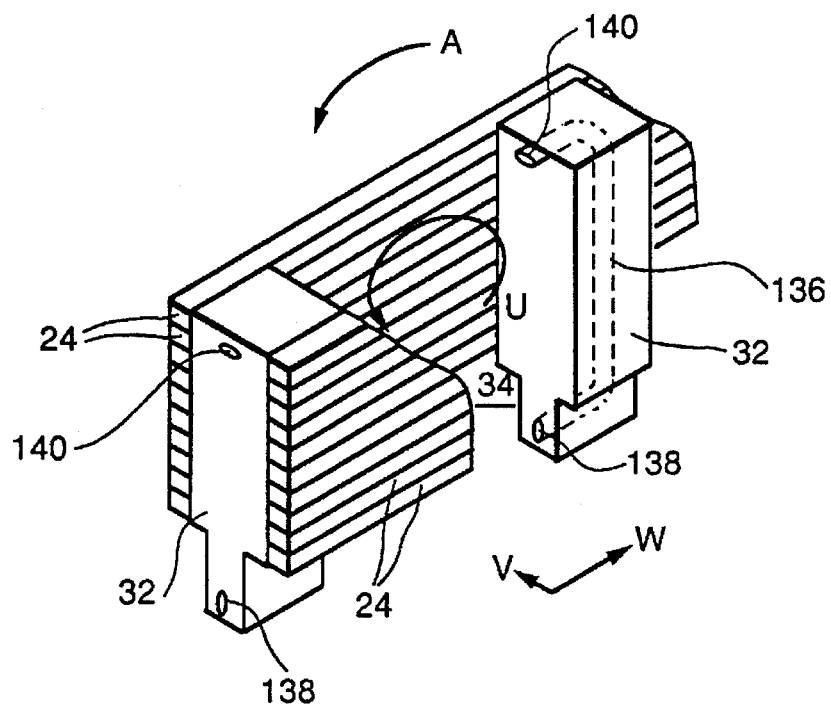
FIG. 4 is a perspective view, partially broken away, of a portion of the rotor end turn region showing a second embodiment of the present invention.

Turning now to FIG. 4, a second embodiment of the present invention is shown. FIG. 4 shows a partial section of the rotor endwinding showing one of the cavities 34 with the direction of rotation indicated by arrow A. As before, the cooling gas velocities relative to the inner radius of the rotor endwinding have component velocities V and W in the axial and circumferential directions, respectively. The relative velocities drive the circulation velocity U inside the cavity 34. In accordance with the present invention, each spacer 32 is provided with an internal cooling gas duct 136 for increasing the circulation velocity U inside the cavities 34 and thereby increasing heat removal. Like the ducts of the first embodiment, each cooling gas duct 136 is oriented radially with respect to the rotor 10 and extends from a point radially inward of, or below, the endwinding to a point near the retaining ring 26. The ducts 136 thus provide passages through which cooling gas can flow from the annular region between the endwinding and the rotor spindle 14 to the cavities 34.

Specifically, each duct 136 extends from an inlet opening 138 located near the radially inward end of the spacer 32 to an outlet opening 140 located near the radially outward end of the spacer 32, near the retaining ring 26. The inlet opening 138 is disposed on an circumferentially-oriented surface of the spacer 32 facing the circumferential velocity component W. As seen in FIG. 4, the inlet opening 138 is located on the portion of the spacer 32 that extends below the endwinding so as to be in fluid communication with the annular region between the endwinding and the rotor spindle 14. In this embodiment, the portion of the spacer 32 extending below the endwinding is narrower in the axial direction then the rest of the spacer 32. By reducing the size of this portion of the spacer 32, flow blockage from upstream spacers is minimal. The outlet opening 140 is disposed on a circumferentially-oriented surface of the spacer 32 and is in fluid communication with one of the cavities 34 bounded by the spacer 32.

The second embodiment functions in the same manner as the first embodiment in that cooling gas is driven through the inlet openings 138 into the ducts 136. The cooling gas is then expelled into the corresponding cavities 34 from the outlet openings 140 in such a manner that the circulation velocity U inside each cavity 34 is accelerated. In general, when the axial velocity component V is larger than the circumferential velocity component W, then the first embodiment is the most effective at increasing heat removal. When the reverse is true, then the second embodiment provides the best heat removal.

As can be seen in FIG. 2, the cavities 34 of each endwinding comprise circumferentially-oriented or "end-strap" cavities and axial coil side cavities. It should be noted that while endstrap cavities are shown in FIGS. 3 and 4, the present invention is equally applicable to the axial coil side cavities. The only difference is that the axial coil side cavities are oriented transverse to the direction of rotation instead of being oriented along the direction of rotation as the endstrap cavities are. This means that the relationship of the axial velocity component V the and circumferential velocity component W to the cavity would be reversed from that shown in FIGS. 3 and 4. In other words, the circumferential velocity component W would be perpendicular to the cavity, and the axial velocity component V would be parallel to the cavity.

The foregoing has described a dynamoelectric machine having improved cooling of the endwindings. While specific embodiments of the present invention have been described, it will be apparent to those skilled in the art that various modifications thereto can be made without departing from the spirit and scope of the invention as defined in the appended claims.

What is claimed is:

1. A gas cooled dynamoelectric machine, comprising:

a rotor having a body portion, said rotor having axially extending coils and end turns extending axially beyond at least one end of said body portion;

at least one spacer located between a first and a second end turn, said spacer having a radially-extending duct said duct extending between an inlet opening and an outlet opening, disposed therein; and said duct outlet opening being disposed in said spacer so as to emit said cooling gas flow in the direction of gas flow circulation.

2. The dynamoelectric machine of claim 1 wherein said duct inlet opening is located near the radially inward end of said spacer and said outlet opening is located near the radially outward end of said spacer.

3. The dynamoelectric machine of claim 2 wherein said inlet is formed on an axially-oriented surface of said spacer.

4. The dynamoelectric machine of claim 2 wherein said inlet is formed on a circumferentially-oriented surface of said spacer.

5. The dynamoelectric machine of claim 1 further comprising a plurality of additional spacers located between said end turns, each one of said additional spacers having a radially-extending duct formed therein.

6. A gas cooled dynamoelectric machine, comprising:

a rotor having a spindle and a body portion;

a rotor winding comprising axially extending coils disposed on said body portion and spaced, concentric end turns extending axially beyond at least one of said body portions, said end turns and said spindle defining a space therebetween;

a plurality of spacers located between adjacent ones of said end turns, each one of said spacers having an internal duct, including an inlet opening and an outlet opening, extending from said space between said end turns and said spindle to a cavity located between respective end turns; and said duct outlet opening being disposed in said spacer so as to emit said cooling gas flow in the direction of gas flow circulation.

7. The dynamoelectric machine of claim 6 further comprising a retaining ring disposed around said end turns, each one of said ducts extends from a point radially inward of said end turns to a point near said retaining ring.

8. A gas cooled dynamoelectric machine comprising:

a rotor having a body portion, said body portion comprising a plurality of end turns;

at least a first spacer and a second spacer circumferencially and axially separating respective end turns, said first spacer, said second spacer and said end turns defining a cavity therebetween; and at least one radially-extending duct extending between an inlet opening disposed at a radially inward end of a respective spacer and an outlet opening disposed at a radially outward end of a respective spacer wherein during rotation of said rotor a pressure head drives a cooling gas through said inlet opening to said radially-extending duct and through said outlet opening to a respective cavity.

9. The gas cooled dynamoelectric machine, in accordance with claim 8, wherein said inlet opening is disposed on an axially-oriented surface of a respective spacer.

10. The gas cooled dynamoelectric machine, in accordance with claim 8, wherein said inlet opening is disposed on a circumferentially oriented surface of a respective spacer.

* * * * *